(12) United States Patent
Seo et al.

(10) Patent No.: US 7,394,779 B2
(45) Date of Patent: Jul. 1, 2008

(54) SATELLITE IP MULTICASTING SYSTEM AND METHOD

(75) Inventors: Gwang Ju Seo, Gyeonggi-do (KR); Young Joong Yoon, Seoul (KR); Cheol Woo Kim, Gyeonggi-do (KR); Kyoo Tae Ryoo, Gyeonggi-do (KR); Jong Oun Jang, Gyeonggi-do (KR)

(73) Assignee: KT Corporation, Sungnam-si (KR)

( * ) Notice: Subject to any disclaimer, the term of this patent is extended or adjusted under 35 U.S.C. 154(b) by 917 days.

(21) Appl. No.: 10/641,622

(22) Filed: Aug. 15, 2003

(65) Prior Publication Data

US 2004/0109449 A1    Jun. 10, 2004

(30) Foreign Application Priority Data

Aug. 17, 2002   (KR)   ............... 10-2002-0048658

(51) Int. Cl.
  *H04B 7/185* (2006.01)
(52) U.S. Cl. ............... 370/316; 370/390; 370/401; 725/65
(58) Field of Classification Search ............... None
  See application file for complete search history.

(56) References Cited

U.S. PATENT DOCUMENTS

| | | | |
|---|---|---|---|
| 6,351,467 B1 | 2/2002 | Dillon | |
| 6,553,028 B1 * | 4/2003 | Tang et al. | 370/389 |
| 6,839,348 B2 * | 1/2005 | Tang et al. | 370/390 |
| 6,901,517 B1 * | 5/2005 | Redmore | 726/11 |
| 6,917,983 B1 * | 7/2005 | Li | 709/238 |
| 7,161,934 B2 * | 1/2007 | Buchsbaum et al. | 370/382 |

(Continued)

FOREIGN PATENT DOCUMENTS

JP   9-331348   12/1997

(Continued)

OTHER PUBLICATIONS

RFC 2827, "Network Ingress Filtering: Defeating Denial of Attack which employ IP Source Address Spoofing", 2000, pp. cover.*

(Continued)

*Primary Examiner*—Edan Orgad
*Assistant Examiner*—Jung Park
(74) *Attorney, Agent, or Firm*—Merchant & Gould P.C.

(57) ABSTRACT

The present invention relates to a satellite IP multicasting system and method for constructing an IP multicast network by a unit of internet node having a router for subscriber connection or a switch, and for transmitting a multicasting packet transmitted from a content provider into a local IP multicast network via a satellite. The satellite IP multicasting system features a backbone network, a content provider, a satellite network and a local network. The local network, which is interworked with the backbone network, is configured to multicasting protocol at a router or a switch, performs reverse path forwarding by static multicasting routing setup on a router or a switch connected to the satellite network via Ethernet and on a subscriber router or by IP designation of the same sub-net with source address of IP header of the multicast packet to an output port of a satellite data receiver and a port of a router connected to the satellite data receiver, and transmits the multicast packet into a terminal client.

16 Claims, 9 Drawing Sheets

U.S. PATENT DOCUMENTS

2003/0154404 A1*  8/2003  Beadles et al. .............. 713/201
2003/0200441 A1* 10/2003  Jeffries et al. ............... 713/181
2003/0231629 A1* 12/2003  Banerjee et al. ............ 370/390
2005/0021752 A1*  1/2005  Marimuthu et al. ......... 709/225

FOREIGN PATENT DOCUMENTS

JP          2002-9848        1/2002

OTHER PUBLICATIONS

Ferguson, "RFC 2827—Network Ingress Filtering: Defeating Dinial of Service Attacks which employ IP Source Address Spoofing", May 2000, p.p. cover.*

Huitema, Christian "Routing in the Internet" Network Technology Series.

* cited by examiner

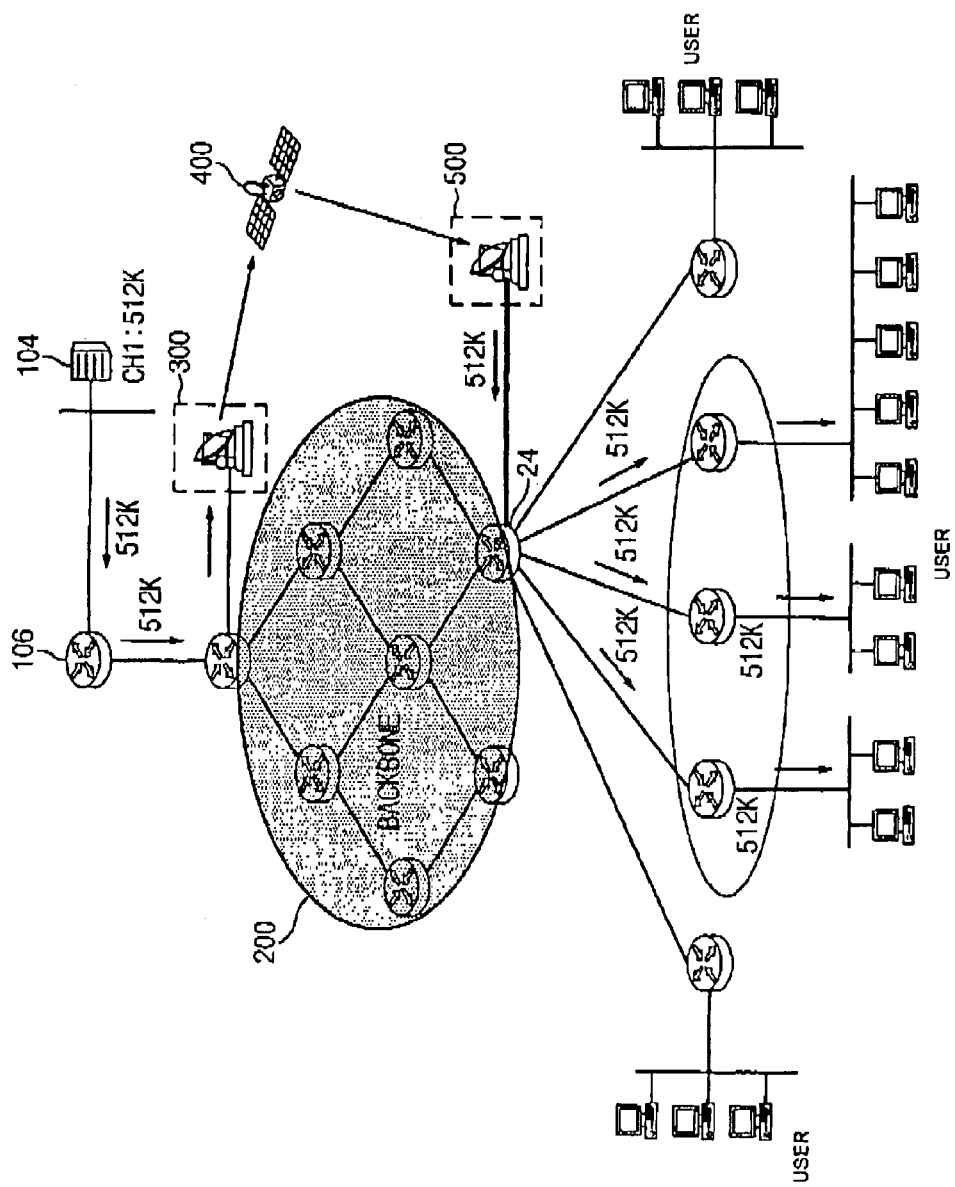

SATELLITE IP MULTICASTING SYSTEM AND METHOD

BACKGROUND OF THE INVENTION

1. Field of the Invention

The present invention relates to an IP multicasting system, and more specifically, to a satellite IP multicasting system wherein satellite multicasting network is used to bypass backbone network of ISP and satellite network is interworked directly to local node of ISP, and method for constructing an IP multicast network by a unit of local node of ISP, that is, or by a unit of internet node having a router for subscriber connection and a switch, and for transmitting a multicasting packet transmitted from a content provider into a local IP multicast network via a satellite, and method for interworking satellite multicasting network and local access network.

2. Description of the Prior Art

In comparison with multicasting protocol, unicasting protocol is inefficient in terms of network traffic and transmission cost because the same data packet is replicated at a source server and is sent respectively to each subscriber who is connected to the source server, which causes network traffic in proportion to the number of concurrent connectors.

Despite the merit of IP multicasting protocol, it is very difficult to embody the solution on the whole internet network due to the network complexity of backbone network and possibility and impact of anomaly during new configuration process.

As shown in FIG. 1, a solution used in current internet broadcasting generally uses a unicasting system wherein a server of an internet broadcasting station exchanges data with a viewer. However, simultaneous connectors should share limited capacity of transmission network between the internet broadcasting station and connectors in the unicasting system.

Suppose that an internet broadcasting provider provides internet broadcasting service via a transmission network of 155 Mbps at a transmission speed of 512K, In this case, when simultaneous connectors are over 300, capacity of transmission network reaches the limit.

If the connectors exceed 300, the screen display is stopped or picture quality is degraded. As a result, a user cannot watch a normal screen.

Referring to FIG. 1, in the Contents Provider (hereinafter, referred to as "CP") such as an internet broadcasting provider, a management server 14 and a media server 12 are connected to a router 10 constituting main nodes. The router 10 is connected to a router 22 of a backbone network 20. The other terminal router 24 of the backbone network 20 is connected to a router 30 constituting networks of corporations or PC bang.

When the CP provides motion picture transmission service of 512 Kbps, and 15 subscribers 32 simultaneously connects with this service, a media server (main server) of the CP in unicasting protocol should transmit data to 15 clients 32, respectively. As a result, actually required capacity of transmission network is 7.680 Mbps (512 Kbps×15) in proportion to data to be transmitted and the number of simultaneous connectors.

The CP should secure a band of bottleneck interval (between the router 10 and the router 22 of the backbone network 20) so that simultaneous connectors may receive the service without delay. However, since it costs a great deal for security of sufficient band, the CP cannot but limit the number of simultaneous connectors or the content transmission speed.

In case of the band of bottleneck interval secured as 8 Mbps, if the number of simultaneous connectors exceeds 15, a required band exceeds 8 Mbps. As a result, a user cannot receive the normal motion picture service.

When contents such as internet broadcasting are provided with the unicast system, channels cannot be effectively used due to bottleneck phenomenon of network. The bottleneck phenomenon also causes the increase in CPU load of the media server 12 or the routers 10 and 22 of the CP for duplicating data as many as the number of clients. As a result, the unicast system is not suitable when the internet broadcasting has a lot of clients.

The security of required transmission band, the limit of subscribers and the enlargement of server capacity mainly degrade profitability of content providers. When subscribers of more than the transmission band are allowed for improvement of profitability, transmission delay occurs so that service of good quality cannot be provided. Additionally, the CP should reduce the amount of content data to attract subscribers as many as possible in a limited transmission line. As a result, the quality of image is degraded, and improvement of contents and internet broadcasting business is prevented.

In order to solve the problem of the unicast system, a content delivery network (hereinafter, referred to as "CDN") solution is suggested.

The CDN comprises streaming servers 26 individually disposed in various local nodes 28 of a backbone network 20 other than a media server (main server) 12 of a CP. The CDN provides contents from the most adjacent local node to a user by previously mirroring main contents to the streaming server 26 of the local node 28. The CDN reduces a system (server, switch, router) path which a subscriber connects with and pass through, thereby decreasing transmission delay resulting from network traffic and distributing load of the media server 12 of the CP to simultaneous connection of subscribers. As a result, the quality of service to transmission speed and transmission delay is more or less improved.

If a user connects with a management server 14 of the CP hosting in the CDN to select motion picture watching, the management server 14 of the CP transmits a URL (uniform resource locator) of corresponding contents in the main node management system (not shown) into the user, and the user requires the corresponding contents to the main node management system of the CDN with the transmitted URL.

The main node management system of the CDN detects location of a user to transmit a URL of the optimum local node router 24. If the user request contents to the local node router 24 corresponding to the URL transmitted from the CDN management system, the streaming server 26 of the local node router 24 transmits motion images into the user that requests the contents.

However, the above-described CDN has not solved the problems of unicast transmission systems. Although the media server 12 of the CP may load traffic to push multimedia contents into local nodes (e.g. 11 local nodes) using a leased channel, connectors should share the limited line capacity of networks from the streaming server 26 of the local node router 24 to subscribers like the above-mentioned problem of the unicast transmission system of FIG. 1.

Additionally, in proportion to the transmission speed and the number of simultaneous connectors, the transmission band required between the main server and various local node streaming servers should be hired from internal service providers or CDN providers.

In spite of the above-described problems such as traffic of network in the conventional unicast transmission system and the CDN solution, the limitation in the number of simultaneous connectors and the cost resulting from enlargement of capacity of leased channels, to embody an IP multicasting solution on the whole internet network is difficult in aspects of technology, time and cost.

As a result, it is difficult to smoothly provide content service for internal broadcasting or internet in education wherein multiple access is performed via the conventional internet network.

SUMMARY OF THE INVENTION

Accordingly, it is an object of the present invention to embody an IP multicasting network from a content provider to a terminal subscriber by interworking a ground transmission network with a satellite multicasting network used to bypass the backbone network in which it is very difficult to embody multicasting protocol due to network complexity and high possibility of network anomaly.

It is another object of the present invention to embody a satellite IP multicasting network to overcome the limitation in transmission paths of content providers, capacity enlargement of servers and the number of simultaneous connectors.

It is still another object of the present invention to embody a IP multicasting network from a content provider to a terminal subscriber by embodying local IP multicasting network and interworking the local IP multicasting network with a satellite network.

In an embodiment, a satellite IP (Internet Protocol) multicasting system comprises a backbone network, a content provider, a satellite network and a local network. The content provider provides multimedia contents. The satellite network transmits contents provided from the content provider in the form of multicast packet to the local node of ISP. The local network, which is interworked with the backbone network, is configured to multicasting protocol at a router or switch, performs reverse path forwarding by static multicasting routing setup on a router connected to the satellite network via Ethernet and on a subscriber router or by designating IP of the same sub-net with source address of IP header of the multicast packet to an output port of a satellite data receiver and a port of a router connected to the satellite data receiver, and transmits the multicast packet into a terminal client.

Preferably, the satellite network comprises a satellite hub system, a satellite and a satellite reception system. The satellite hub system comprises a multimedia server for designating a multicast group address to the multimedia packet, an IP gateway for transforming the multimedia packet into transport stream data, a modulator for modulating the transport stream data and a satellite transmitter for wirelessly transmitting data. The satellite reception system comprises a satellite receiver for receiving a satellite modulating signal from the satellite and a satellite data receiver for demodulating a multicast packet made in the multimedia server from the satellite modulating signal and transmitting the multicast packet into a predetermined destination.

It is preferable that the router of the local network declares multicast packet as well as multicasting protocol to be static multicast routing to a start source IP for proper RPF check or designates IP of the same sub-net with source address of IP header of the multicast packet to an output port of a satellite data receiver and a port of a router connected to the satellite data receiver.

In an embodiment, an IP multicasting method of a multicast packet of a router in a local network interworked with a backbone network comprises performing unilateral reverse path forwarding with static multicast routing declaration of the router to the multicast packet or with IP designation of the same sub-net with source address of IP header of the multicast packet to an output port of a satellite data receiver and a port of a router connected to the satellite data receiver, wherein the declaration or the designation is constituted of a source IP of a destination media server of the multicast packet.

BRIEF DESCRIPTION OF THE DRAWINGS

The above and further advantages of the invention may be better understood by referring to the following description, in conjunction with the accompanying drawings, wherein:

FIG. 6 illustrates the traffic state according to an embodiment of the present invention.

DETAILED DESCRIPTION OF THE PREFERRED EMBODIMENTS

In an embodiment, multimedia contents to be streamed from a CP to a satellite transmission system is transmitted with a multimedia packet. The satellite transmission system transmits a satellite modulating signal corresponding to the multimedia packet via a satellite into a satellite reception system. The satellite reception system demodulates the satellite modulating signal into the multimedia packet to transmit the demodulated signal into a local IP multicasting network. The local IP multicasting network forwards the multimedia packet into a terminal router.

Figure 3:
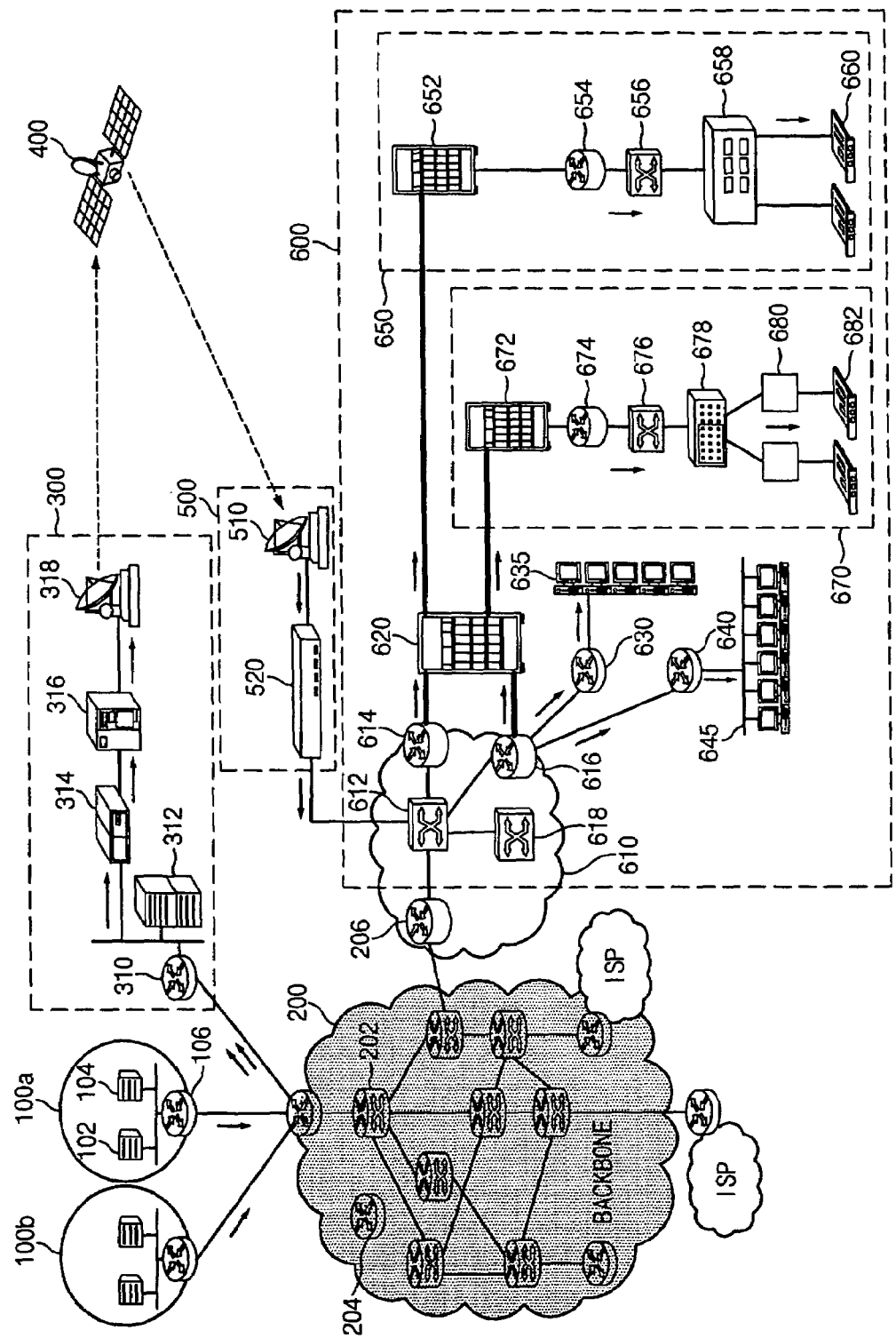
FIG. 3 illustrates a satellite IP multicasting system according to a preferred embodiment of the present invention.

Referring to FIG. 3, the content providers 100a and 100b such as internet broadcasting station or cyber university connected to a backbone network 200 comprise a management server 102, a streaming server 104 and a router 106.

The management server 102 controls networks, internet connection, authentication and streaming. The streaming server 104 provides multimedia contents, interworked with control of the management server 102. Here, the multimedia packet is preferably transmitted with unicasting or multicasting protocol.

The backbone network 200 comprises a plurality of switches 202 and a plurality of routers 204. The terminal router 204 constitutes a main node connected to the router 106. The terminal router 206 of the backbone network 200 is connected to a local network 600.

The multimedia packet transmitted from the CP 100a and 100b with unicasting protocol is transmitted via the main node of the backbone network 200 into a router 310 of a satellite transmission system 300. Here, the backbone network 200 identifies a destination address of the multimedia packet to transmit the multimedia packet into a destination router 310.

The above multimedia packet is transformed into a satellite modulating signal in the satellite transmission system 300. The satellite transmission system 300 comprises a multimedia server 312, an IP gateway 313, a modulator 316 and a satellite transmitter 318, which are connected to the router 310, via a network each other. The satellite transmission system 300 performs a unilateral transmission into a local network 600.

The multimedia server 312 designates a multicast group address to transform the multimedia packet transmitted with unicasting protocol into a multicasting packet, and determines a transmission speed of contents depending on packet residual period in the network, that is, TTL values and on required service quality.

The IP gateway 314 performs a statistical multiplexing function on multicast data transmitted from the multimedia server 312 and a CAS (Conditional Access System) function. The IP gateway 314 also attaches a program identifier to various multicast data to transform the data into a MPEG-2 transport stream signal, and then transmits the stream signal into the modulator 316.

For communication with a satellite 400, the modulator 316 modulates the MPEG-2 transport stream signal into a DVB-S signal and transmits the DVB-S signal into the satellite transmitter 318.

The satellite transmitter 318 sends data to the satellite 400 by a predetermined carrier frequency signal.

The multimedia server 312 designates a multicast group address to he multimedia packet transmitted from the satellite transmission system 300 with the unicast protocol. The IP gateway 314 transforms the multimedia packet into the transport stream data. The transport stream data are modulated in the modulator 316, and then sent from the satellite transmitter 318.

For the satellite 400 up-linked with the satellite transmission system 300 and down-linked with the satellite reception system 500 are used INMARSAT having a frequency band of L/S band (upward 1.5 Ghz, downward 1.5 Ghz/2.5 Ghz), INTELSAT of C band (upward 6 Ghz, downward 4 Ghz), Koreasat Mugunghwa No. 1 and 2 of Ku band (upward 14 Ghz, downward 12 Ghz) or Koreasat Mugunghwa No. 3 of Ka band (upward 30 Ghz, downward 20 Ghz). A satellite having the optimum frequency band may also be selected in consideration of economical efficiency and applicability to systems depending on intentions of manufacturers.

The satellite reception system 500 comprises a satellite receiver 510 and a satellite data receiver 520. The satellite receiver 510 transmits a signal received from the satellite 400 into the designated satellite data receiver 520. The satellite data receiver 520 demodulates the multicast packet made in the multimedia server 312 from the satellite modulating signal to transmit the demodulated packet into the local network 600.

The local network 600 comprises an internet network node 610, sub-networks 650 and 670, routers 630 and 640 and subscriber terminals 635 and 645. The internet network node 610 comprises a router or a switch for local nodes of ISP, that is, for subscriber connections. The sub-networks 650 and 670 are connected to an optical terminal station 620 connected to the internet network node 610. The routers 630 and 640 are comprised in PC bang connected to the internet network node 610. Here, the sub-network 650 comprises an optical terminal station 652 connected to the optical terminal station 620, and the sub-network 670 comprises an optical terminal station 672 connected to the optical terminal station 620. The optical terminal station 652 is connected to a router 654, a switch 656, a switching hub 658 and LAN cards 660. The optical terminal station 672 is connected to a router 674, a switch 676, a concentrator 678, modems 680 and LAN cards 682.

The internet network node 610 comprises a router 206 connected to the backbone network 200, a plurality of switches 612 and 618, and routers 614 and 616 connected to subscribers.

In the above-described local network 600, the multicast packet demodulated in the satellite data receiver 520 is multicast into a terminal of a corresponding subscriber through the switches 612 and 618 and the routers 614 and 616 of the internet network node 610.

In the local network 600, the router of the local network declares the multicast packet to be static multicast routing to a source address or designates IP of the same sub-net with source address of IP header of the multicast packet to an output port of a satellite data receiver and a port of a router connected to the satellite data receiver.

Specifically, the routers 614 and 616 of the internet network node 610, and the routers 630, 640, 654 and 674 of the lower network judge whether data is a multicast packet. When the data is a multicast packet, the routers declare the multicast packet to be static multicast routing to an IP of the source address or designates IP of the same sub-net with source address of IP header of the multicast packet to an output port of a satellite data receiver and a port of a router connected to the satellite data receiver.

Figure 1:
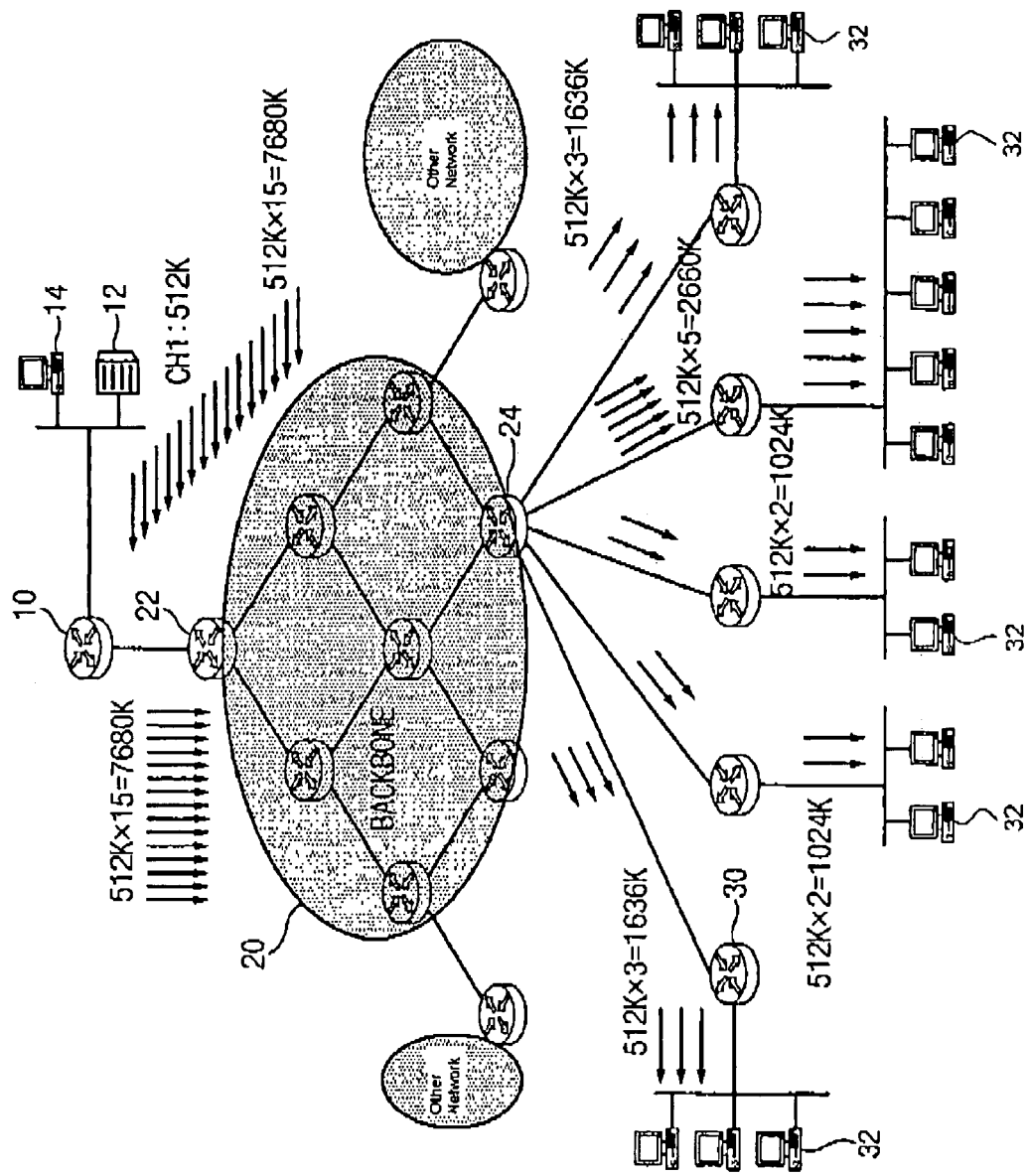
FIG. 1 illustrates a conventional unicast transmission method.
Figure 2:
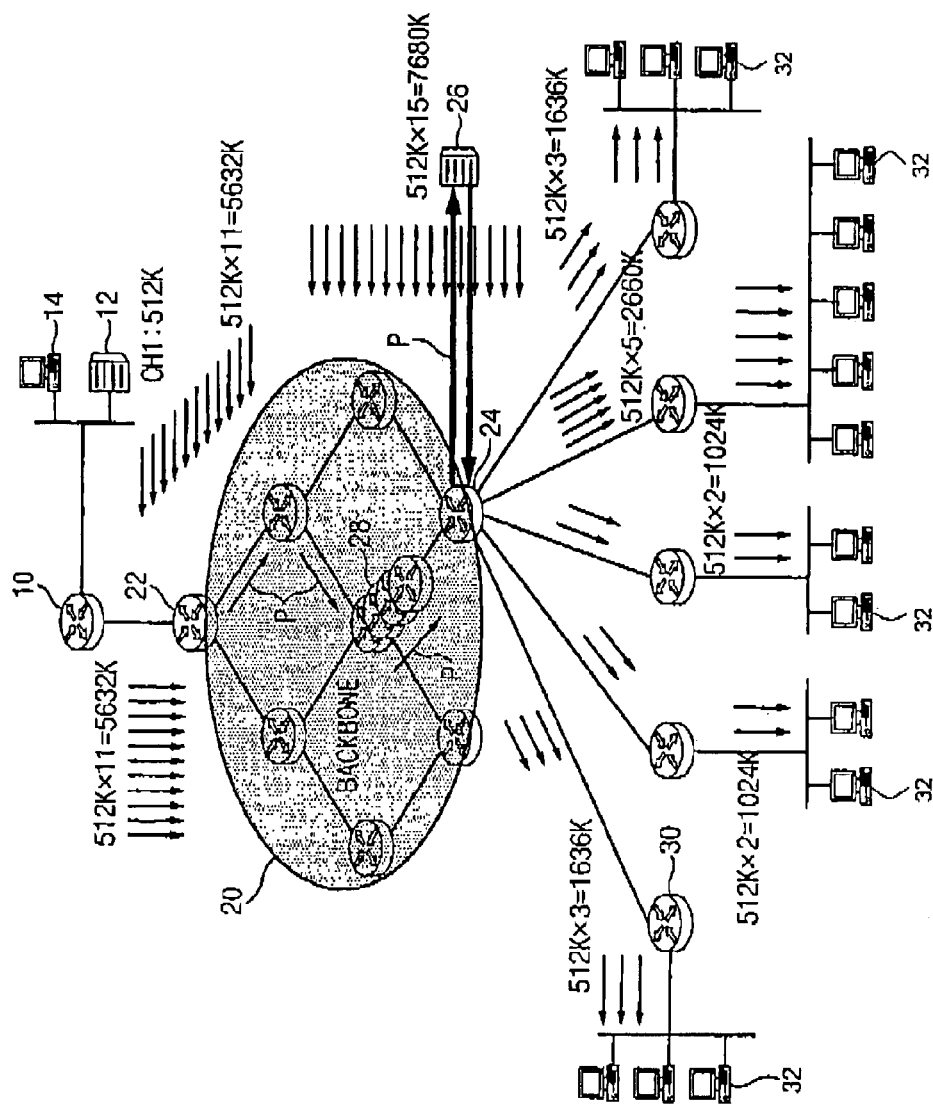
FIG. 2 illustrates the conventional CDN-type service.
Figure 4:
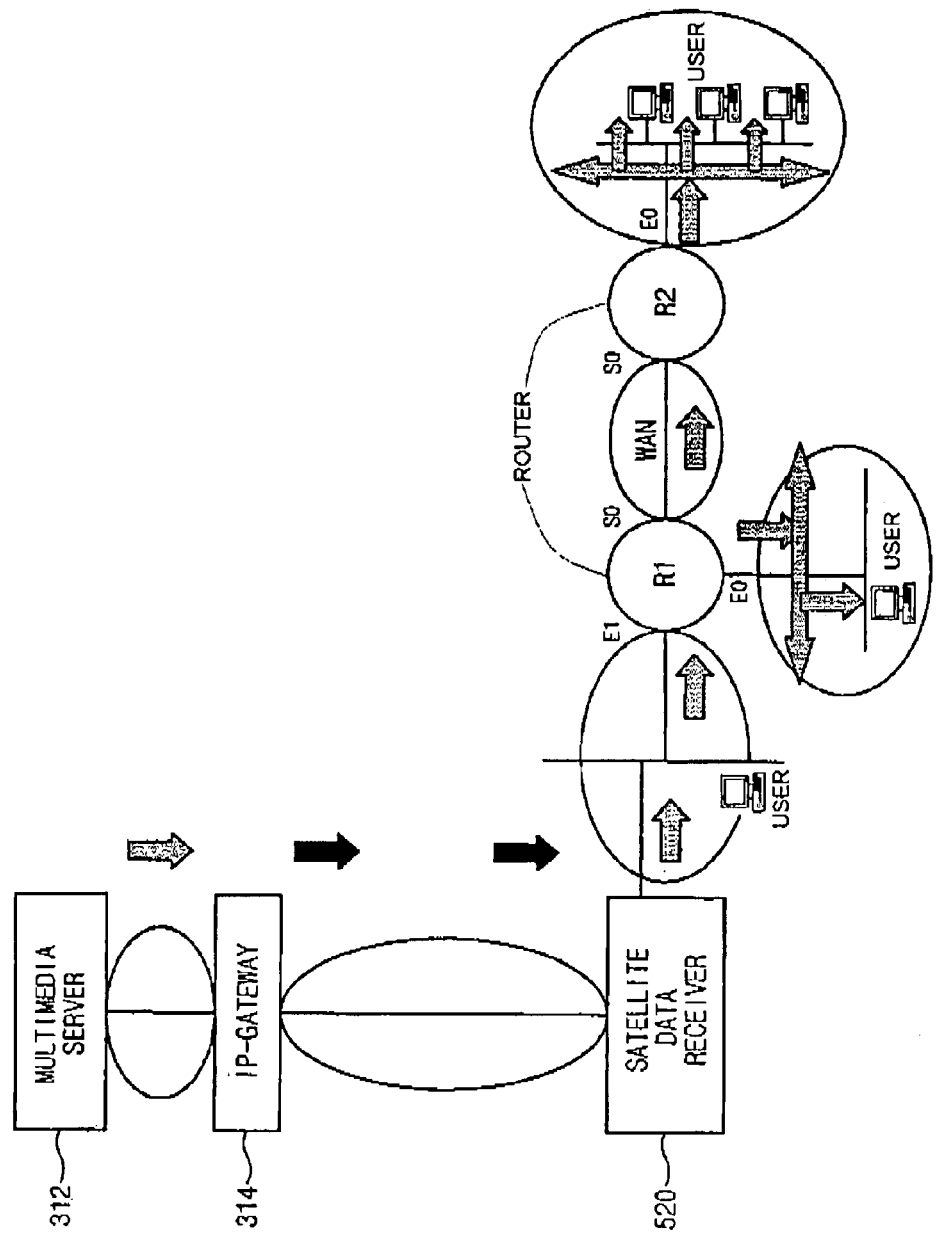
FIG. 4 illustrates the multicasting packet transmission operation according to an embodiment of the present invention.

Referring to FIG. 4, a router R1 corresponds to the first routers 614 and 616 of FIG. 3, and a router R2 corresponds to the second routers 630, 640, 654 and 674 of FIG. 1.

In case of the multicast packet, the router R1 declares static multicasting routing to IP of an output port of the satellite data receiver 520. The router R2 declares the multicasting routing to the source address to be static multicast routing to a serial interface IP of the router R1 or designates IP of the same sub-net with source address of IP header of the multicast packet to an output port of a satellite data receiver and a port of a router connected to the satellite data receiver.

The router R2 sets a predetermined traffic to be transmitted not by repeated packet duplication but by once packet duplication between the routers R1 and R2, that is, the serial interval.

In other words, only one packet is duplicated even when all clients are connected to the same multimedia contents in e0 of the router R2.

The source address of the multicasting routing is used to send traffic to a group represented by a multicast group address. The multicast router determines directions toward the source and the clients.

Here, the transmission into the receiver is RPF (Reverse Path Forwarding).

The RPF helps the router to properly distribute traffic toward the receiver. If the multicast packet is entered, the router checks the RPF. If the check result is normal, the packet is forwarded. Otherwise, the packet is dropped.

The satellite data receiver 520 transmits the multicast packet from the media server 312 into the router R1. Without specific setup of routing, the router R1 cannot perform a normal RPF check on the multimedia packet.

Since the interval between the IP gateway 314 and the satellite data receiver 520 is a unilateral interval via a satellite network, the network between the router R1 and the media server 312 is disconnected. Thus, even when the multicast packet reaches the router R1, the router R1 does not perform a proper RPF process because the router R1 does not have a unicast routing table to the source. As a result, the router R1 does not forward but drops the multimedia packet when the router R1 configures multicasting protocol.

In an embodiment, the filtering in the routers R1 and R2 and the proper setup of TTL values to channel address represented by the group in the media server 312 prevent all hosts from being senders. Therefore, an inflow of the multicast packet from subscriber terminals is intercepted.

The unilateral multicast routing is set by the static multicast routing for the proper RPF check in the routers R1 and R2 or by IP designation of the same sub-net with source address of IP header of the multicast packet to an output port of a satellite data receiver and a port of a router connected to the satellite data receiver. As a result, the RPF drop resulting from the network disconnection due to unilateral characteristic of satellite interval can be prevented.

In case of the router R1 [cisco router], the IP multicasting setting is done as presented below:
ip multicasting
int e0
ip pim sparse-mode
int e1
ip pim sparse-mode
int s0
ip pim sparse-mode
ip mroute [source ip address] [ip address of Ethernet connection port to the router R1 of the satellite data receiver]

Otherwise, IP of the same sub-net with source address of IP header of the multicast packet can be designated to an output port of a satellite data receiver and a port of a router connected to the satellite data receiver.

Although the cisco routers are exemplified for the router setup herein, the setup may be changed depending on equipment and the same principle is applied.

Figure 5A:
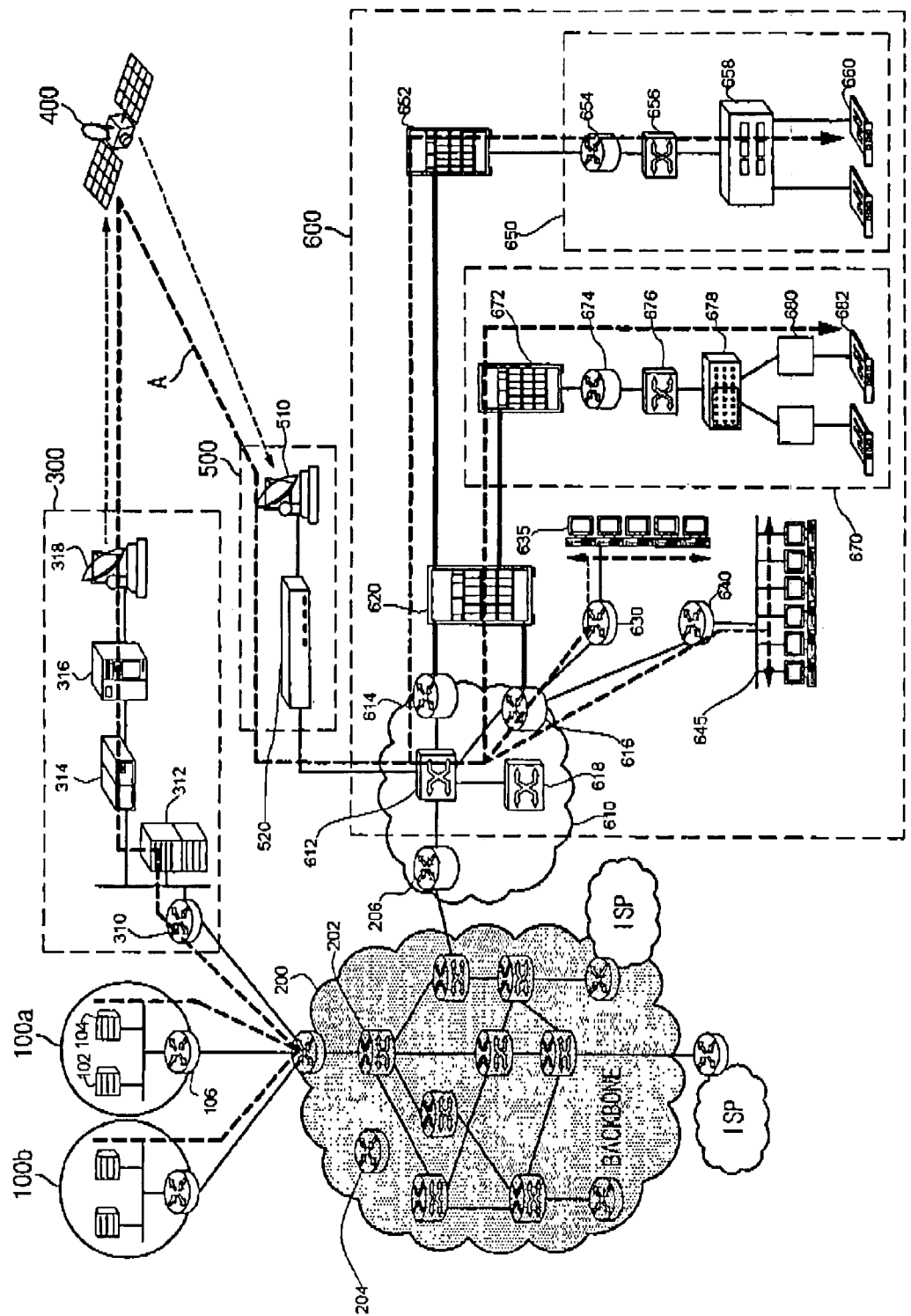
FIGS. 5a through 5d illustrate the multicasting group authentication process according to an embodiment of the present invention.

Referring to FIG. 5a, contents are transmitted into a terminal subscriber client of the local network through path A of FIG. 5a.

Figure 5B:
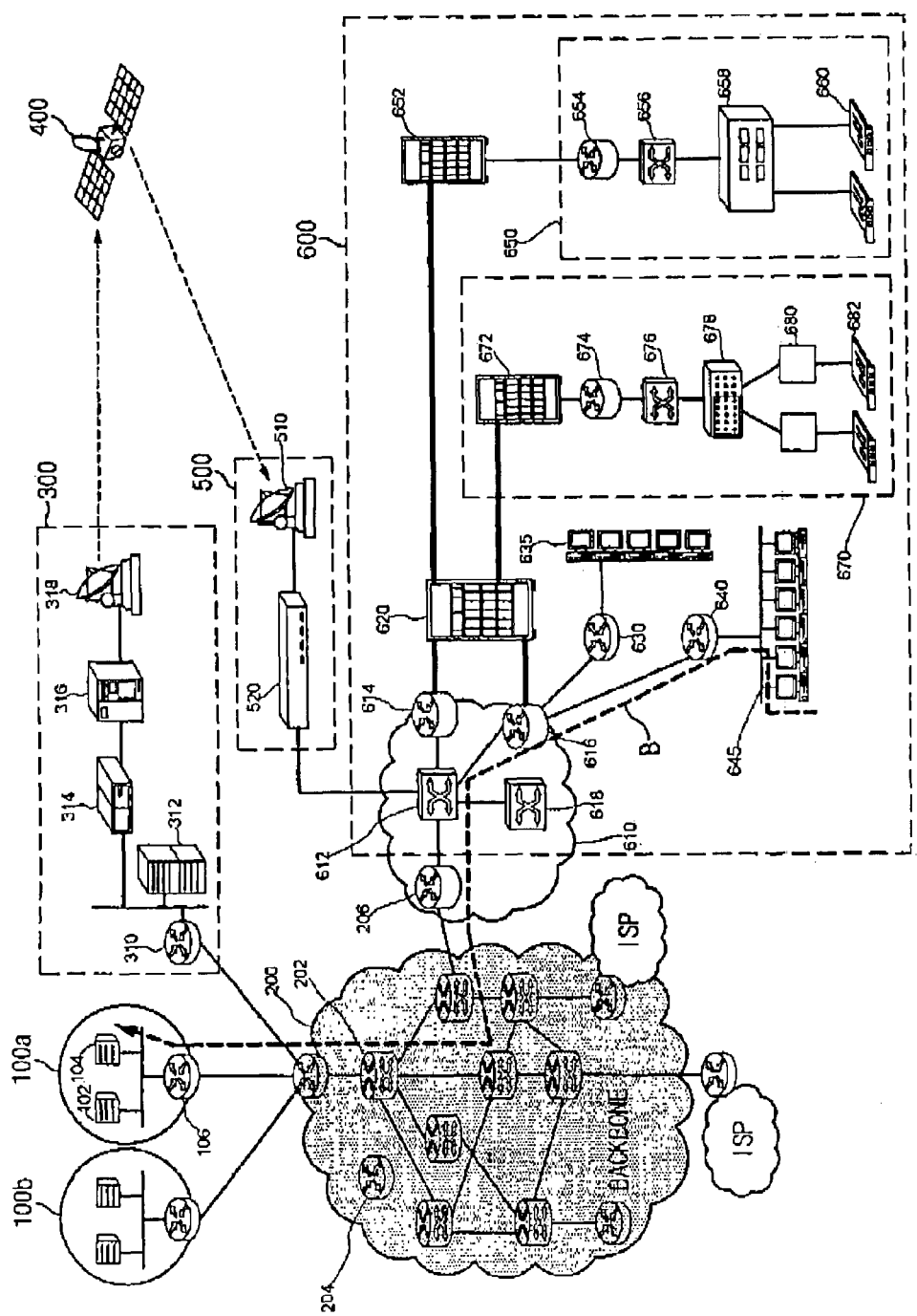
Figure 5C:
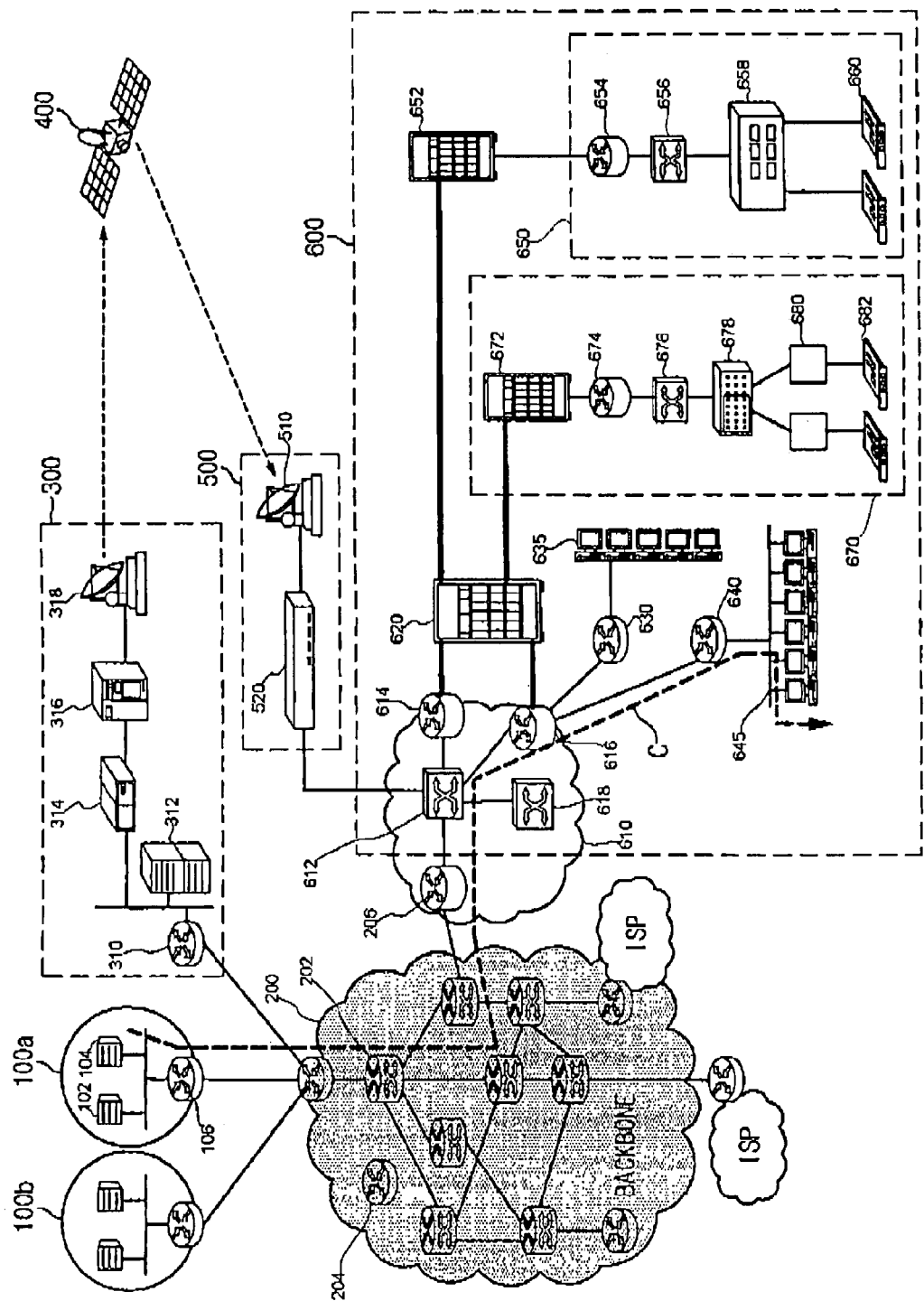
Figure 5D:
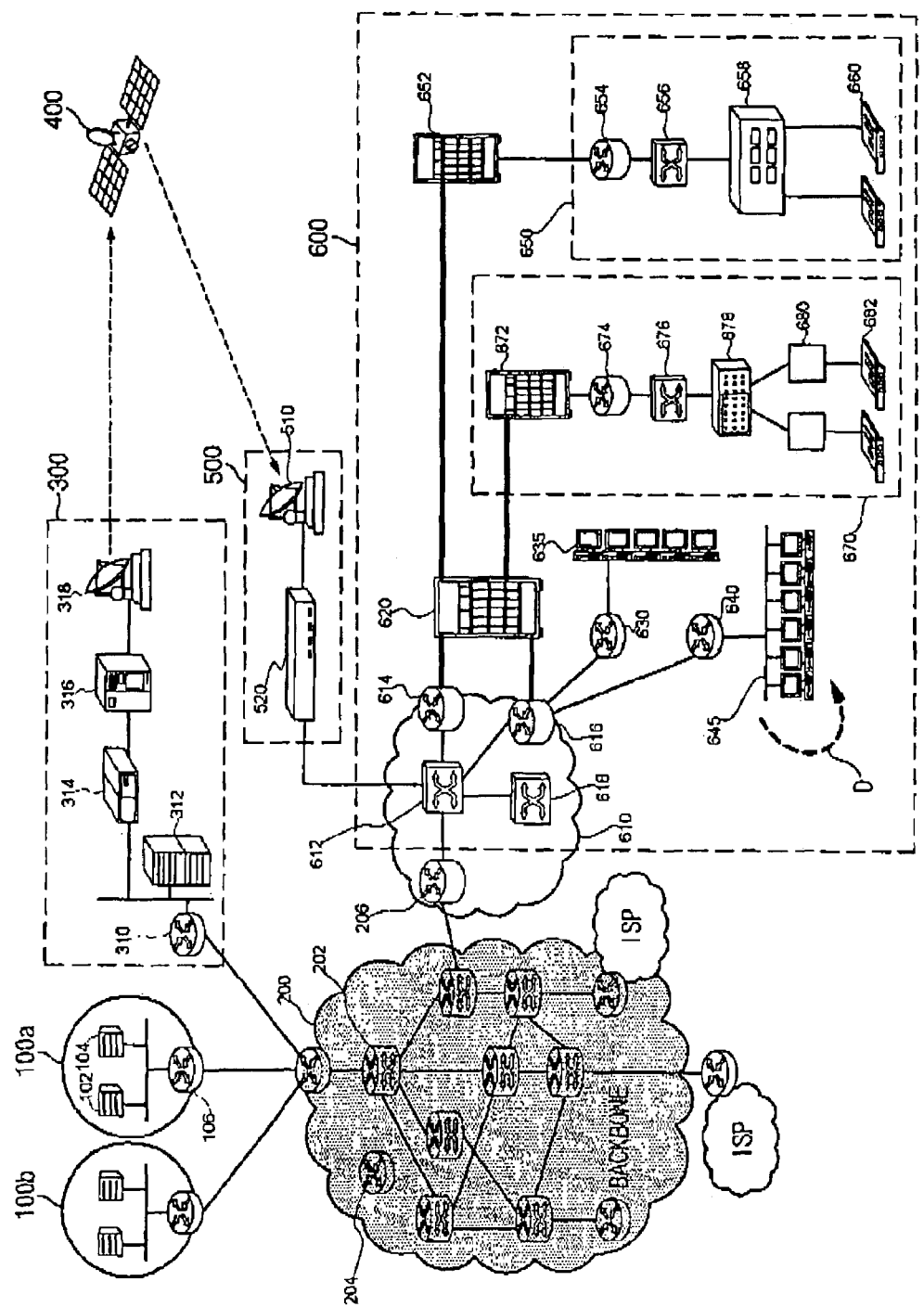

A subscriber authenticated as a predetermined multicast group connects with the management server 102 of the CP 100a via the wide area network 610 and the backbone network 200 through path B of FIG. 5b in order to request IGMP (Internet Group Management Protocol). When the subscriber is proved to be legitimate, the management server 102 of the CP 100a performs authentication through path C of FIG. 5C, and authorizes the subscriber to enter the multicast group. A user proved to be legitimate through the above authentication process may receive a multicast packet transmitted into LAN of the local network 600 through path D of FIG. 5d.

As shown in FIG. 6, contents corresponding to a channel, for example motion picture of 512K can be transmitted depending on unicast protocol from the streaming server 104 of the CP through the router 106 and the terminal router of the backbone network 200 to the satellite transmission system 300. The satellite signal is unilaterally transmitted between the satellite transmission system 300 and the satellite reception system 500. The traffic of 512K is transmitted into terminal clients by each path included in the local network 600.

Since only a multicast packet is transmitted into a terminal client, the number of simultaneous connectors is not limited, and the bottleneck phenomenon resulting from the large number of simultaneous connectors from the CP to the internet network or in each interval of the local network does not occur. As a result, the traffic of the whole network may be improved.

The embodiment of the present invention may be selectively applied in case of multimedia contents which require real time transmission, and may be also applied with the unicast transmission system in case of non-real time transmission.

Other embodiment according to the present invention may be variously provided. Specifically, a case wherein the local network according to an embodiment is applied to the CDN. In other words, if the static multicast routing declaration applied to the CDN is performed in the local network, the contents transmitted via the conventional unicast protocol may be transmitted via the multicast protocol according to an embodiment of the present invention.

Accordingly, an IP multicasting system according to an embodiment of the present invention enables the efficient and stabilized operation of networks due to reduction of multimedia traffic on the whole network for communication operator.

Additionally, according to an embodiment of the present invention, the network environment satisfactory to content providers that require transmission of high capacity multimedia data such as internet broadcasting, tele-education or multi-user internet game.

While the invention is susceptible to various modifications and alternative forms, specific embodiments have been shown by way of example in the drawings and described in detail herein. However, it should be understood that the invention is not limited to the particular forms disclosed. Rather, the invention covers all modifications, equivalents, and alternatives falling within the spirit and scope of the invention as defined in the appended claims.

What is claimed is:

1. A satellite IP (Internet Protocol) multicasting system comprising:
    a backbone network;
    a content provider for providing multimedia contents;
    a satellite network for transmitting contents provided from the content provider via a satellite and for providing contents with a multicast packet; and
    a local network, interworked with the backbone network, for configuring the multicast packet as multicasting protocol from a router, performing unilateral reverse path forwarding by static multicasting routing setup on a router connected to the satellite network via Ethernet and on a subscriber router, and transmitting the multicast packet into a terminal client,
    wherein the content provider transmits a multimedia packet into the satellite network via unicast protocol,
    wherein the satellite network comprises:
    a satellite transmission system comprising a multimedia server for designating a multicast group address to the multimedia packet, an IP gateway for transforming the multimedia packet into transport stream data, a modulator for modulating the transport stream data and a satellite transmitter for wirelessly transmitting data;
    a satellite; and
    a satellite reception system comprising a satellite receiver for receiving a satellite modulating signal from the satellite and a satellite data receiver for demodulating a multicast packet made in the multimedia server from the satellite modulating signal and transmitting the packet into a predetermined destination.

2. The system according to claim 1, wherein the router of the local network declares the multicast packet to be static multicast routing to a start source IP.

3. The system according to claim 1, wherein the router of the local network designates IP of the same sub-net with source address of IP header of the multicast packet to an output port of a satellite data receiver and a port of a router connected to the satellite data receiver.

4. The system according to claim 1, wherein the real time multimedia packet is transmitted into the local network via the satellite network, and the non-real time data is transmitted into the local network via the backbone network.

5. A satellite IP (Internet Protocol) multicasting system comprising:
    a backbone network;
    a content provider for providing multimedia contents;
    a satellite network for transmitting contents provided from the content provider via a satellite and for providing contents with a multicast packet; and a local network, interworked with the backbone network, for configuring the multicast packet as multicasting protocol from a router, performing unilateral reverse path forwarding by IP designation of the same sub-net with source address of IP header of the multicast packet to an output port of a satellite data receiver and a port of a router connected to the satellite data receiver, and transmitting the multicast packet into a terminal client, wherein the content provider transmits a multimedia packet into the satellite network via unicast protocol, wherein the satellite network comprises:

a satellite transmission system comprising a multimedia server for designating a multicast group address to the multimedia packet, an IP gateway for transforming the multimedia packet into transport stream data, a modulator for modulating the transport stream data and a satellite transmitter for wirelessly transmitting data;

a satellite; and a satellite reception system comprising a satellite receiver for receiving a satellite modulating signal from the satellite and a satellite data receiver for demodulating a multicast packet made in the multimedia server from the satellite modulating signal and transmitting the packet into a predetermined destination.

6. The system according to claim 5, wherein the router of the local network declares the multicast packet to be static multicast routing to a start source IP.

7. The system according to claim 5, wherein the router of the local network designates IP of the same sub-net with source address of IP header of the multicast packet to an output port of a satellite data receiver and a port of a router connected to the satellite data receiver.

8. The system according to claim 5, wherein the real time multimedia packet is transmitted into the local network via the satellite network, and the non-real time data is transmitted into the local network via the backbone network.

9. A satellite IP (Internet Protocol) multicasting system comprising:

a backbone network;

a content provider for providing multimedia contents;

a satellite network for transmitting contents provided from the content provider via a satellite and for providing contents with a multicast packet; and a local network, interworked with the backbone network, for configuring the multicast packet as multicasting protocol from a router, performing unilateral reverse path forwarding by static multicasting routing setup on a router connected to the satellite network via Ethernet and on a subscriber router, and transmitting the multicast packet into a terminal client, wherein the content provider transmits a multimedia packet into the satellite network via multicast protocol, wherein the satellite network comprises:

a satellite transmission system comprising a multimedia server for designating a multicast group address to the multimedia packet, an IP gateway for transforming the multimedia packet into transport stream data, a modulator for modulating the transport stream data and a satellite transmitter for wirelessly transmitting data;

a satellite; and a satellite reception system comprising a satellite receiver for receiving a satellite modulating signal from the satellite and a satellite data receiver for demodulating a multicast packet made in the multimedia server from the satellite modulating signal and transmitting the packet into a predetermined destination.

10. The system according to claim 9, wherein the router of the local network declares the multicast packet to be static multicast routing to a start source IP.

11. The system according to claim 9, wherein the router of the local network designates IP of the same sub-net with source address of IP header of the multicast packet to an output port of a satellite data receiver and a port of a router connected to the satellite data receiver.

12. The system according to claim 9, wherein the real time multimedia packet is transmitted into the local network via the satellite network, and the non-real time data is transmitted into the local network via the backbone network.

13. A satellite IP (Internet Protocol) multicasting system comprising:

a backbone network;

a content provider for providing multimedia contents;

a satellite network for transmitting contents provided from the content provider via a satellite and for providing contents with a multicast packet; and a local network, interworked with the backbone network, for configuring the multicast packet as multicasting protocol from a router, performing unilateral reverse path forwarding by IP designation of the same sub-net with source address of IP header of the multicast packet to an output port of a satellite data receiver and a port of a router connected to the satellite data receiver, and transmitting the multicast packet into a terminal client, wherein the content provider transmits a multimedia packet into the satellite network via multicast protocol, wherein the satellite network comprises:

a satellite transmission system comprising a multimedia server for designating a multicast group address to the multimedia packet, an IP gateway for transforming the multimedia packet into transport stream data, a modulator for modulating the transport stream data and a satellite transmitter for wirelessly transmitting data;

a satellite; and a satellite reception system comprising a satellite receiver for receiving a satellite modulating signal from the satellite and a satellite data receiver for demodulating a multicast packet made in the multimedia server from the satellite modulating signal and transmitting the packet into a predetermined destination.

14. The system according to claim 13, wherein the router of the local network declares the multicast packet to be static multicast routing to a start source IP.

15. The system according to claim 13, wherein the router of the local network designates IP of the same sub-net with source address of IP header of the multicast packet to an output port of a satellite data receiver and a port of a router connected to the satellite data receiver.

16. The system according to claim 13, wherein the real time multimedia packet is transmitted into the local network via the satellite network, and the non-real time data is transmitted into the local network via the backbone network.

* * * * *